Jan. 3, 1939. L. A. PATTEN 2,142,825
SALT BLOCK FOR CATTLE
Filed April 14, 1937
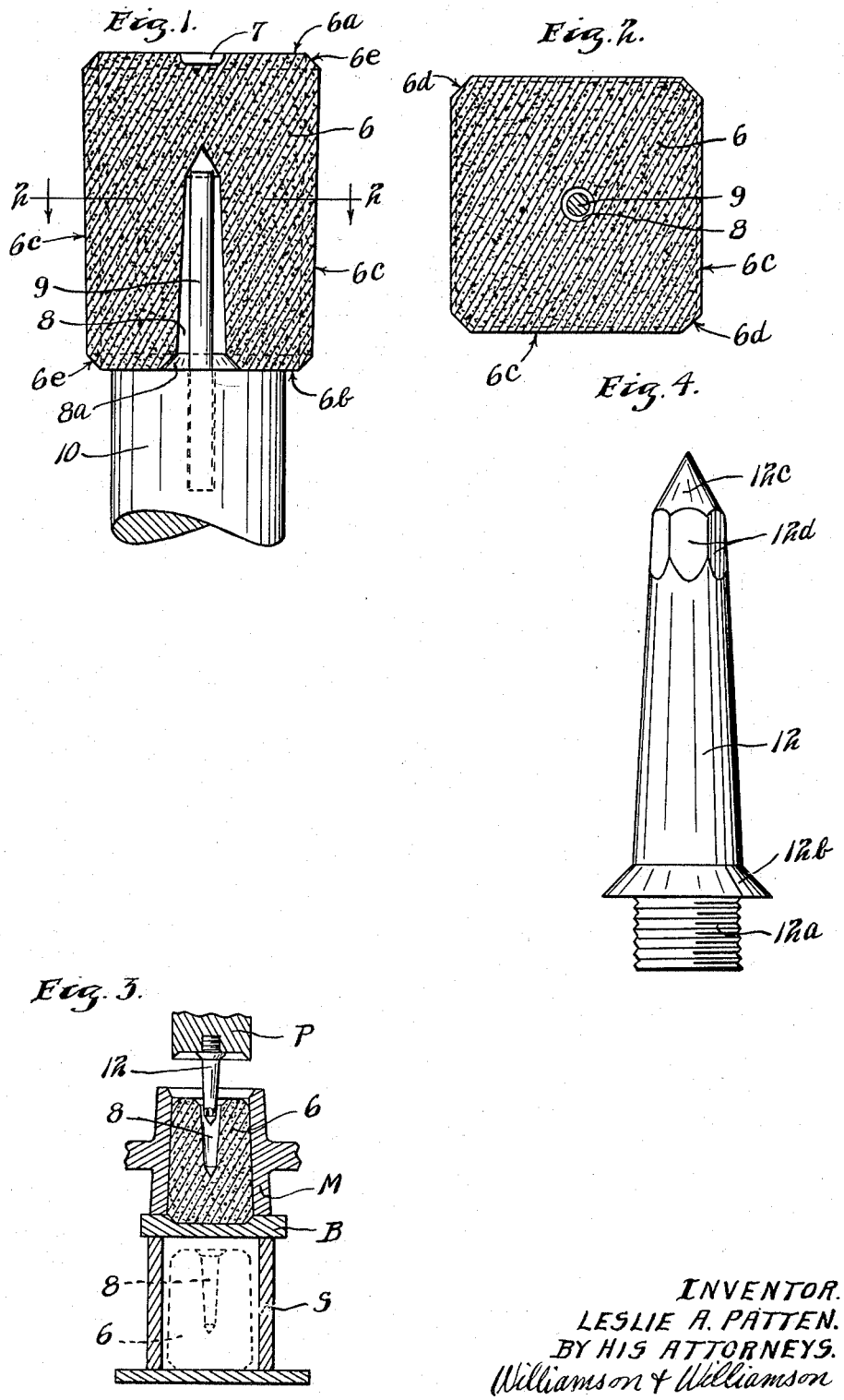
INVENTOR.
LESLIE A. PATTEN.
BY HIS ATTORNEYS.
Williamson & Williamson Patented Jan. 3, 1939

2,142,825

UNITED STATES PATENT OFFICE 2,142,825

SALT BLOCK FOR CATTLE

Leslie A. Patten, Mankato, Minn.

Application April 14, 1937, Serial No. 136,869

4 Claims. (Cl. 119—51)

This invention relates to the manufacture and use of a highly compressed, homogeneous salt block for cattle and the like which may be conveniently and rotatably mounted to facilitate licking by the animal and to further minimize deterioration or contamination through weather conditions and contact with foreign substances.

My present application is a continuation of all subject matter in common of my co-pending application, S. N. 99,145, entitled "A stock licking salt block."

It is an object of my invention to provide a very hard dense block constructed from homogeneous edible granular or crystallized material, such as common salt (NaCl) which is so constructed as to enable it to be very efficiently mounted for turning above the ground on a supporting surface and which, through its inherent homogeneous construction and method of making the same, is highly successful for withstanding weather conditions and for consumption by cattle and other animals.

A further object is the provision of a highly compressed salt block of the type described which may be successfully provided with a tapered bore or aperture extending preferably from the bottom end thereof for considerable distance axially of the block co-operatively associated in use with an upstanding supporting element upon which the apertured interior of the block is rotatively received.

The problem of commercially manufacturing a highly compressed salt block having an axial passage extending partly through the block is considerably different from the problem of coring moulded material such as concrete, plastic or comminuted mixtures of ingredients which are inherently hard and dense or which are self hardening in nature. Extremely high pressures have to be utilized in successfully making a salt block, to adequately bond the fine granular materials together and to form a sufficiently dense and hardened body to retain its shape under various weather conditions. In making compressed salt blocks, it is often necessary to use pressures exceeding 750 tons of pressure on a 50 pound finished block. Collapsible cores and perforation methods are, therefore, totally impractical.

In my invention, the requisite uniform density of the compressed material and the physical construction of the finished block containing the tapered axial aperture or attachment passage is very closely associated with and dependent upon my improved method for manufacture of this block.

It is, therefore, a further object of my invention to provide a comparatively simple but highly efficient method for making a very efficient uniformly compressed block of the type and structure described.

A still further object is the provision of an extremely simple but highly efficient apparatus for feeding salt to livestock in or out-of-doors, said apparatus including the provision of a particular structure of salt block as well as a simple mounting which, through its co-operative relation, enables the block to be vertically mounted with freedom for turning by the animals and which successfully withstands rain or inclement weather and further makes impossible contamination of the salt by germs or foreign materials.

These and other objects and advantages of my invention will be more fully set forth in the following description made in connection with the accompanying drawing, in which like reference characters refer to similar parts throughout the several views, and, in which:

Fig. 1 is a view showing a preferred form of my salt block in vertical section mounted upon a suitable supporting medium;

Fig. 2 is a cross section taken substantially on the line 2—2 of Fig. 1;

Fig. 3 is a diagrammatic vertical section illustrating in general a suitable apparatus for successfully manufacturing my preferred form of salt block;

Fig. 4 is a side elevation of the coring die of the pressing mold detached.

In the form of my compressed salt block illustrated in the drawing a symmetrical body 6 is formed having generally flat parallel top and bottom surfaces 6a and 6b. The block is of preferably polygonal cross section having a plurality of flat substantially vertical side faces 6c and provided with chamfered longitudinal corners 6d. The horizontal corners of the block are also preferably chamfered or beveled as at 6e and a small depression or hand-hole 7 may be formed in the upper end of the block, as shown in Fig. 1, to facilitate handling or piling of the blocks in conjunction with the axial aperture or passage in the opposite end thereof. The body 6 is provided with an elongated passage 8 in general tapering from the flat bottom of the block inwardly and upwardly and terminating some distance short of the top 6a of the body. The entrance of the mounting aperture or passage 8 is preferably countersunk at 8a to further facilitate attachment of the block to a simple supporting structure by reception of an upstanding pipe or rod 9.

In the preferred attachment and mounting means of my invention, the upstanding member 9 is preferably secured to and projected above a supporting surface, such as the end of a post 10, and the length of the upstanding member 9 is preferably so related to the length of the passage 8 that the flat bottom surface of the block is received upon the surface of the support 10 with the member 9 extending to a point near the upper end of the passage 8.

When my block is mounted for use as shown in Fig. 1, the cross sectional configuration of the body 6 with the multiplicity of the flat side surfaces 6c as well as the chamfered corners 6d facilitates turning of the block which cattle desire and further assures a substantially uniform consumption of the salt by a licking process. The tapering of the mounting passage or aperture with the countersunk entrance 8a thereto facilitates disposal of the block in operative position upon the mounting and further enables pipes or upstanding supporting members 9 of various cross sectional areas to be successfully utilized with my block while still assuring a block of a substantial engagement with the support to prevent the block being displaced or uplifted during the consumption of salt and licking action.

To manufacture an efficient block having the axial passage 8 for attachment and connection with the vertical mounting presented a problem. Salt is not an inherently hard material nor could a self-hardening cement or bonding material be mixed with the salt to give a product of the edible nature required. Exceedingly high pressures must be utilized for compressing the crystalline or granular substance to produce a sufficiently compressed block for withstanding moisture and consumption by licking. To provide such a block with an axial passage was impossible with molding methods which included a collapsible core or die.

Because of the inherent properties of highly compressed salt and furthermore the requisite length of the body, perforation methods were impractical in producing the aperture or passage 8. The usual core action obtained in concrete block machines with a head or extremity on the male member of the mold or plunger proved impractical for the reason that the material at the upper end of the block was compressed to a greater extent than the portions at the side of the block and would cause the block to disintegrate upon use and subjection to rain.

After considerable experiment, I discovered that the high pressures necessary to properly compress the salt into a dense block could be utilized in a molding process if a mold plunger were provided with a rather sharply tapered die core having a head or extremity of sharply tapered smaller size than the shank portion of the core. The apparatus illustrated in Figs. 3 and 4 have been found highly satisfactory for producing the particular block illustrated in Figs. 1 and 2 and have been found to form a block of substantially uniform density or compression throughout which was well adapted for the particular mounting disclosed herein.

As shown in Fig. 3, a mold plunger P having a lower molding surface constructed to mold the upper beveled end of the block is provided being attached to a hydraulic or other power-actuated means for producing adequate pressure, and, in this connection I prefer a pressure of at least 700 tons upon a 50 pound block to be produced. The mold case M has tapered sides to facilitate ejection of the block and in the form shown the sides taper from the lower end of the mold case to the upper end. The mold case M is open ended, and in the form shown a bed plate B shaped on its upper surface to mold the beveled bottom construction of the body 6 is removably mounted on heavy upstanding supports S. A special coring die 12 is secured to the plunger P in depending axial relation and has a shank portion tapering from its attached end to its outer or lower end. Any suitable means of attachment can be provided, such as the screw-threaded plug portion 12a which is threadedly connected with the mold plunger. A sharply tapered fillet 12b is disposed between the plunger P and the shank of the die 12 and forms the countersinking 8a in the finished block. It is important that the extremity 12c of the coring die be sharply tapered and diminished as by forming a conical end, as shown, and I have obtained improved results by flatting the sides of the shank adjacent conical end 12c to make this portion of somewhat less cross sectional area than the main portion of the shank.

In employing my method with suitable apparatus, salt in granular crystalline state is poured into the mold casing above the bed plate B and the plunger P is then forced downwardly with the aforesaid pressure, the special coring die 12 being forced axially through the salt under high pressure and, because of the diminished die tip 12c and the rather sharply tapered shank of the die permitting displacement and movement of the salt particles to co-operate with the plunger and mold in producing a block of substantially uniform density and compression throughout, and preventing the formation of a relatively dense central portion below the tip of the die which follows unless a diminished tip is used in the molding action.

After the block has been compressed, the pressure is released, the mold case M moved upwardly a short distance with the block therein, and the bed plate B may be removed, whereafter downward movement of the plunger P may be continued through the mold casing to eject the completed block below the mold in the position shown by the dotted lines in Fig. 3.

A block made by the method disclosed has the axially disposed tapered mounting aperture nicely hardened for reception of the mounting pipe 9 and is so densely compressed that it will withstand rain or water and retain its shape and furnish a relatively large amount of salt.

From the foregoing description, it will be seen that I have provided an extremely simple but very highly efficient salt block for cattle and the like co-operatively associated with a very simple vertical mounting, which attains the objects previously recited.

It will further be seen that I have devised a simple method and one which may be carried out very economically from a commercial standpoint to produce the improved salt block disclosed herein.

What is claimed is:

1. As a new article of manufacture, a highly compressed salt block of the class described, comprising a uniformly dense body of polygonal cross section, said body having an axial aperture extending from one of its ends to a point some distance from its opposite end, said axial aperture being tapered inwardly for facilitating insertion of a vertically disposed mounting element and having a substantially flat bottom which is adapted to take the thrust and be supported upon a supporting surface.

2. In a device for supplying salt to cattle, a symmetrical highly compressed salt body having a substantially uniform density and being of polygonal cross sectional shape, said body having a substantially uniformly tapered axial aperture extending inwardly and tapering from its lower end and having a flat lower supporting surface from which the axis of said aperture extends perpendicularly and a support for said body having a substantially horizontal supporting surface upon which the bottom of said body may rest and having a substantially vertical mounting member extending upwardly into said apertured portion for a considerable distance.

3. In a device for supplying salt to domestic animals, a highly compressed salt block having a flat base disposed perpendicularly to its longitudinal center line, said block having a central aperture extending longitudinally and upwardly from said base into said block, and a support for said block having a substantially horizontal supporting surface upon which the base of said block may rest, and having a substantially central, upwardly projecting mounting member extending upwardly into said apertured portion.

4. In a device for supplying salt to cattle and the like, a block composed of substantially dry particles of salt compressed under sufficient pressure to provide a substantially homogeneous finished article free of any bonding material, said block having formed therein a substantially axial aperture extending inwardly from one point on the block for a considerable distance toward an opposite point on said block and terminating within said block, and a substantially vertical block supporting element extending into said aperture, said aperture thereby opening downwardly to prevent the accumulation of moisture therein.

LESLIE A. PATTEN.